(12) United States Patent
Moyer et al.

(10) Patent No.: US 8,627,471 B2
(45) Date of Patent: Jan. 7, 2014

(54) PERMISSIONS CHECKING FOR DATA PROCESSING INSTRUCTIONS

(75) Inventors: William C. Moyer, Dripping Springs, TX (US); Michael D. Snyder, Cedar Park, TX (US); Gary L. Whisenhunt, Leander, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 499 days.

(21) Appl. No.: 12/259,369

(22) Filed: Oct. 28, 2008

(65) Prior Publication Data

US 2010/0107243 A1 Apr. 29, 2010

(51) Int. Cl.
*G06F 11/00* (2006.01)

(52) U.S. Cl.
USPC ............................ 726/23; 711/163; 711/207

(58) Field of Classification Search
USPC .................................. 726/23; 711/163, 207
See application file for complete search history.

(56) References Cited

U.S. PATENT DOCUMENTS

| | | | |
|---|---|---|---|
| 4,016,545 A | 4/1977 | Lipovski | |
| 4,851,990 A * | 7/1989 | Johnson et al. | 710/100 |
| 5,191,649 A | 3/1993 | Cadambi | |
| 5,469,556 A * | 11/1995 | Clifton | 711/163 |
| 5,848,293 A | 12/1998 | Gentry | |
| 6,219,775 B1 | 4/2001 | Wade | |
| 6,247,064 B1 | 6/2001 | Alferness et al. | |
| 6,253,273 B1 | 6/2001 | Blumenau | |
| 6,336,178 B1 | 1/2002 | Favor | |
| 6,490,642 B1 | 12/2002 | Thekkath et al. | |
| 6,591,355 B2 | 7/2003 | Schuster et al. | |
| 6,829,698 B2 | 12/2004 | Arimilli et al. | |
| 2004/0230836 A1 | 11/2004 | Larsen | |
| 2004/0243823 A1 | 12/2004 | Moyer et al. | |
| 2005/0229089 A1 | 10/2005 | Oza et al. | |
| 2005/0240745 A1 | 10/2005 | Iyer | |
| 2005/0257025 A1 | 11/2005 | Spencer | |
| 2007/0094475 A1 * | 4/2007 | Bridges et al. | 711/207 |
| 2007/0150671 A1 | 6/2007 | Kurland | |
| 2007/0180518 A1 | 8/2007 | Moyer | |
| 2007/0266206 A1 | 11/2007 | Kim et al. | |
| 2008/0229052 A1 * | 9/2008 | Ozer et al. | 711/202 |
| 2009/0106533 A1 * | 4/2009 | Arakawa | 712/205 |

OTHER PUBLICATIONS

PCT/US2009/058928 International Search Report and Written Opinion mailed Apr. 27, 2010.
U.S. Appl. No. 12/259,368, Moyer et al, Office Action dated Nov. 10, 2011.
U.S. Appl. No. 12/259,368, Inventor William C. Moyer, "Data Processor for Processing a Decorated Storage Notify", filed Oct. 28, 2008, Office Action—Rejection, mailed Oct. 9, 2012.
U.S. Appl. No. 12/259,368, Moyer et al, "Permissions Checking for Data Processing instructions", Office Action—mailed Jun. 13, 2013.

* cited by examiner

*Primary Examiner* — Carl Colin
*Assistant Examiner* — S. Ali Zaidi

(57) ABSTRACT

A data processing system having a processor and a target device processes decorated instructions (i.e. an instruction having a decoration value). A device of the data processing system such as the processor sends transactions to the target device over a system interconnect. The transactions include an indication of an instruction operation, an address associated with the instruction operation, a decoration value (i.e. a command to the target device to perform a function in addition to a primary function of the executed instruction), and access permissions associated with the address. The target device (e.g. a memory with functionality in addition to storage functionality) determines whether a decoration operation specified by the decoration value is permissible based on the received access permissions. The target device performs the decoration operation if appropriate permissions exist.

21 Claims, 6 Drawing Sheets

| OPERATION TABLE ||||
|---|---|---|---|
| INSTRUCTION OPERATION | DECORATION VALUE | DECORATION OPERATION | PERMISSIONS REQUIRED FOR OPERATION |
| DECORATED LOAD | 000 | CLEAR LOCATION | W |
| | 001 | INCREMENT LOCATION, PROVIDE LAST VALUE | R, W |
| | 010 | READ LOCATION | R |
| | ⋮ | ⋮ | ⋮ |
| | 111 | NULL | - |
| DECORATED STORE | 000 | ADD VALUE TO LOCATION | R, W |
| | 001 | ADD VALUE FROM SOURCE LOCATION INDICATED BY STORE DATA VALUE TO LOCATION | R, W |
| | ⋮ | ⋮ | ⋮ |
| | 111 | MULTIPLY VALUE WITH LOCATION | W |
| LOAD | - | READ LOCATION | - |
| STORE | - | WRITE LOCATION | - |

| OPERATION TABLE |||| 
|---|---|---|---|
| INSTRUCTION OPERATION | DECORATION VALUE | DECORATION OPERATION | PERMISSIONS REQUIRED FOR OPERATION |
| DECORATED LOAD | 000 | CLEAR LOCATION | W |
| | 001 | INCREMENT LOCATION, PROVIDE LAST VALUE | R, W |
| | 010 | READ LOCATION | R |
| | ⋮ | ⋮ | ⋮ |
| | 111 | NULL | – |
| DECORATED STORE | 000 | ADD VALUE TO LOCATION | R, W |
| | 001 | ADD VALUE FROM SOURCE LOCATION INDICATED BY STORE DATA VALUE TO LOCATION | R, W |
| | ⋮ | ⋮ | ⋮ |
| | 111 | MULTIPLY VALUE WITH LOCATION | W |
| LOAD | – | READ LOCATION | – |
| STORE | – | WRITE LOCATION | – |

*FIG. 7*

PERMISSIONS CHECKING FOR DATA PROCESSING INSTRUCTIONS

RELATED APPLICATION

This application is related to our copending application entitled "Data Processor for Processing a Decorated Storage Notify", U.S. Ser. No. 12/259,368, filed of even date herewith and assigned to the assignee of record herein.

BACKGROUND

1. Field

This disclosure relates generally to data processing systems, and more specifically, to access permissions of a target device in a data processing system.

2. Related Art

In a multiple processor or multiple core data processing system that implements a network, multiple counters are used to maintain statistics requiring a variety of functions such as increment, decrement and read-modify-write operations. Because multiple cores may attempt to update the identical counter at the same time, network delays are created and a significant amount of resources are consumed. A mechanism for performing atomic updates, i.e. un-interruptible successive updates, is typically required. Conventional atomic update mechanisms, such as using a software semaphore or a software lock, can cause system delays. To reduce system delays, a statistics accelerator may be used. However, in a single transaction enough information cannot typically be sent to a statistics accelerator to describe an atomic operation.

Because the counter bit sizes can be larger than the size of registers within a processor, a lock variable has also been used to limit access to a counter while multiple storage accesses update sub-sections of the counter. When a core needs to gain ownership of a counter for an atomic update, a significant number of data processing cycles may pass for each lock variable. A processor must use processing cycles to obtain the lock variable, wait for the lock variable to be released if already taken by another processor, perform the counter update and release the lock variable. Thus the system speed and performance is degraded.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 7 illustrates, in table form, an exemplary encoding of instruction operations used by the intelligent memory of FIG. 3;

DETAILED DESCRIPTION

Figure 1:
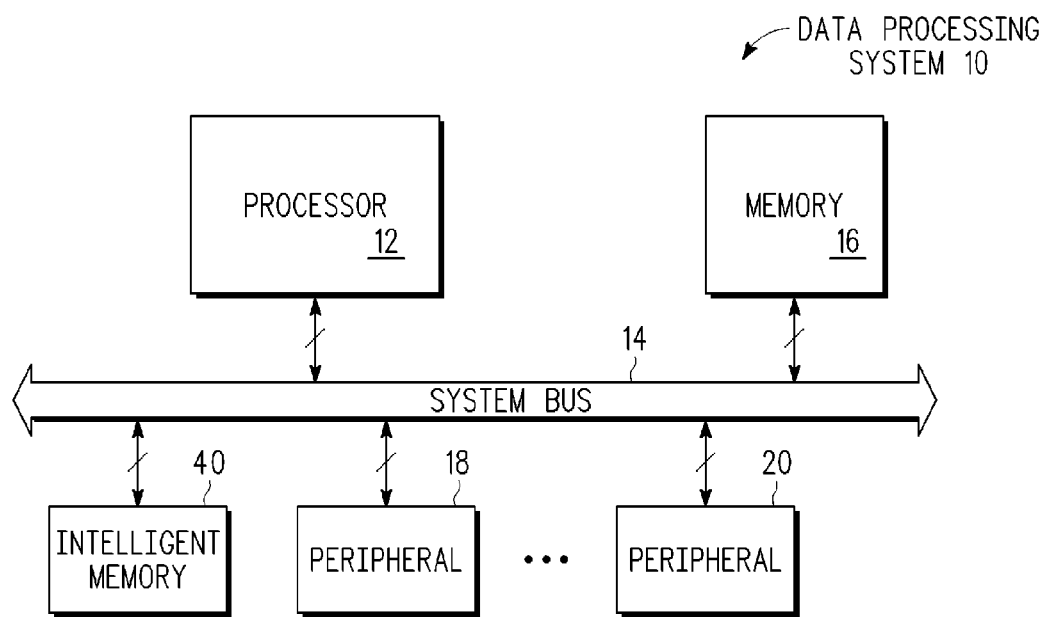
FIG. 1 illustrates in block diagram form a data processing system in accordance with one embodiment of the present invention.

There is herein described a method for operating a data processing system that has a processor and a target device which is a target or recipient of information from the processor. The processor and target device communicate via a system interconnect. The processor executes or processes an instruction. As part of the instruction execution the processor determines an instruction operation associated with the instruction and an address. A decoration value is determined by the processor that is based on the instruction. A decoration value or decoration is information that is supplied to the target device such as a memory for performing decorated storage operations. The decoration value is provided from storage in a general purpose register of the processor and is transmitted to the target device along with a translated address which indicates a target location resulting from the instruction execution. The decoration value is a command to the target device to perform a function in addition to a primary function of the executed instruction. For example, the executed instruction may be a load or a store of data from or to a target memory location, and the decoration value may be a command to increment the target location or to multiply the target location data by another operand. It should be understood that any of various additional or alternate processing functions may be implemented by the target device in response to the decoration value. The decoration value is not generally interpreted by the processor, and a given decoration value may perform different operations requiring different access permissions depending on the target location of the instruction. Note that not all load and store instructions provide decoration values. In one embodiment, separate load, store, load with decoration, and store with decoration instruction types are provided.

As used herein, the term "bus" is a system interconnect and is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

FIG. 1 illustrates, in block diagram form, a data processing system 10 in accordance with one embodiment of the present invention. Data processing system 10 includes a processor 12, a system interconnect or system bus 14, a memory 16 and a plurality of peripherals such as a peripheral 18, a peripheral 20, an intelligent memory 40 and, in some embodiments, additional peripherals as indicated by the dots in FIG. 1 separating peripheral 18 from peripheral 20. An intelligent memory 40 is coupled to the system bus 14 by bidirectional multiple conductors. The memory 16 is a system memory that is coupled to the system bus 14 by a bidirectional conductor that, in one form, has multiple conductors. The intelligent memory 40 is a target device of the processor 12 for certain instruction execution as will be explained below. In the illustrated form each of peripherals 18 and 20 is coupled to the system bus 14 by bidirectional multiple conductors as is the processor 12. Note that memory 16 can be any type of memory, and peripherals 18 and 20 can each be any type of peripheral or device. In one embodiment, all of data processing system 10 is on a single integrated circuit. Alternatively, data processing system 10 can be implemented using more than one integrated circuit. In one embodiment, at least all of processor 12 is on a single integrated circuit. In another form the system bus 14 represents a wireline interconnect and the processor 12 may be physically remote from the target device such as intelligent memory 40. In an alternate embodiment, multiple intelligent modules, such as intelligent memory 40 may be present.

In operation, the processor 12 functions to implement a variety of data processing functions by executing a plurality of data processing instructions. Information needed by processor 12 that is not within the processor 12 is stored in memory 16 or intelligent memory 40. In one embodiment, memory 16 and intelligent memory 40 are referred to as an external memories. Intelligent memory 40 is a memory that includes additional circuitry for performing computations as well as implementing the conventional data storage function that a memory conventionally performs. The computations that intelligent memory 40 performs in response to a memory location access are implementation-specific and may vary in various embodiments. In one form the computations are performed in an atomic fashion meaning that the computations are un-interruptible and are completed prior to allowing a subsequent access request to the memory location being modified by the computation. Examples of atomic computations include, but are not limited to, atomic increment or atomic decrement.

Figure 2:
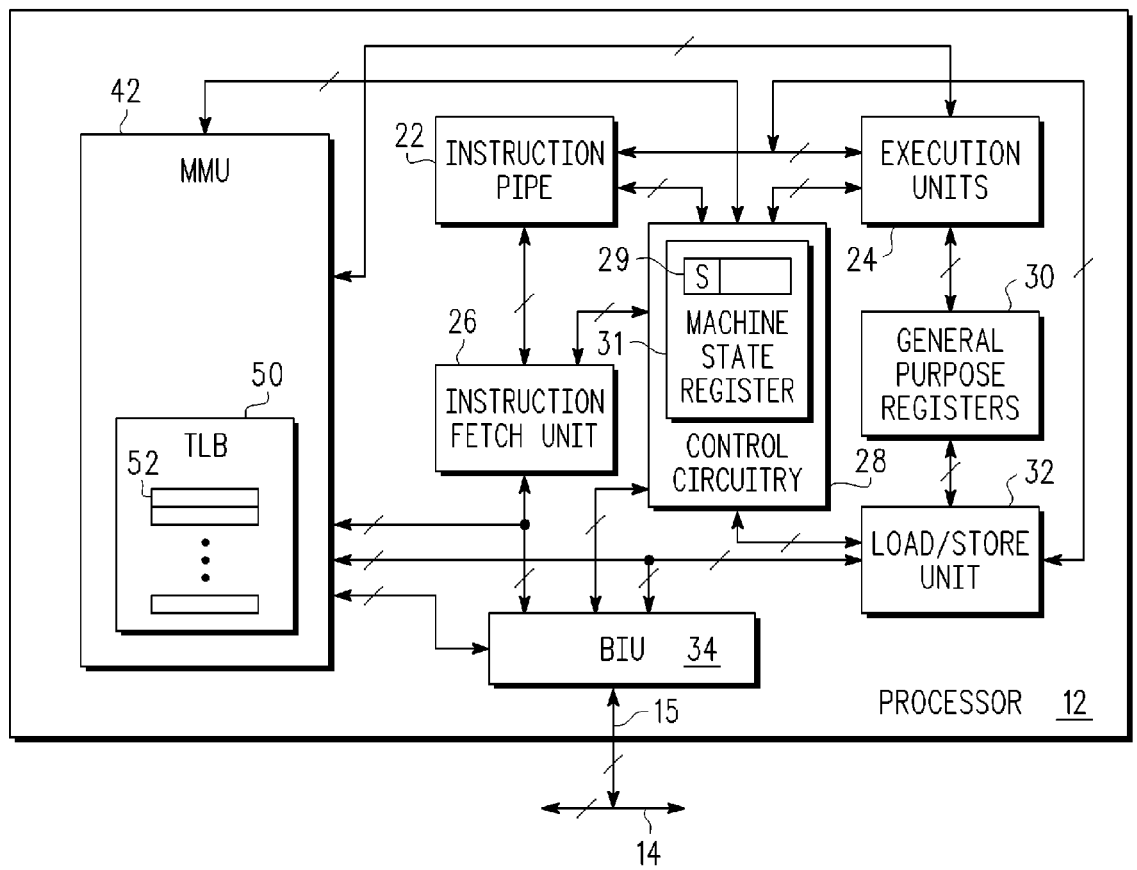
FIG. 2 illustrates in block diagram form an exemplary processor of the data processing system of FIG. 1 in accordance with one embodiment of the present invention.

FIG. 2 illustrates in block diagram form an exemplary architecture of processor 12. The system bus 14 is coupled to a bus interface unit (BIU) 34 via a bidirectional multiple bit conductor for communicating signals 15. The bus interface unit 34 is coupled to a memory management unit (MMU) 42 via a bidirectional multiple bit conductor. Within the memory management unit 42 is a translation look-aside buffer (TLB) 50 having a plurality of entries such as TLB entry 52. The bus interface unit 34 is also coupled to both an instruction fetch unit 26 and to the memory management unit (MMU) 42 via a bidirectional multiple bit conductor. The instruction fetch unit 26 is coupled to an instruction pipeline (pipe) 22 via a bidirectional multiple bit conductor. The instruction pipeline 22 is coupled to a plurality of execution units 24 via a bidirectional multiple bit conductor, and the instruction pipeline 22 is coupled to control circuitry 28 via a bidirectional multiple bit conductor. The instruction fetch unit 26 is coupled to the control circuitry 28 via a bidirectional multiple bit conductor. The memory management unit 42 is coupled to the control circuitry 28 via a bidirectional multiple bit conductor. The control circuitry 28 is coupled to the execution units 24 via a bidirectional multiple bit conductor. The bus interface unit 34 is coupled to the control circuitry 28 via a bidirectional multiple bit conductor. The memory management unit 42 is coupled to the execution units 24 via a bidirectional multiple bit conductor. The control circuitry 28 includes a machine state register 31. Within the machine state register 31 is a register having a supervisor bit 29 designated as "S". The logic state of the supervisor bit 29 determines whether the processor 12 is in a supervisor mode or a user mode. The execution units 24 are coupled to the general purpose registers 30 via a bidirectional multiple bit conductor. The general purpose registers 30 are coupled to a load/store unit 32 via a bidirectional multiple-bit conductor. The load/store unit 32 is respectively coupled to the control circuitry 28, the memory management unit 42 and bus interface unit 34, and the instruction pipeline 22 and execution units 24 via bidirectional multiple bit conductors.

Figure 4:
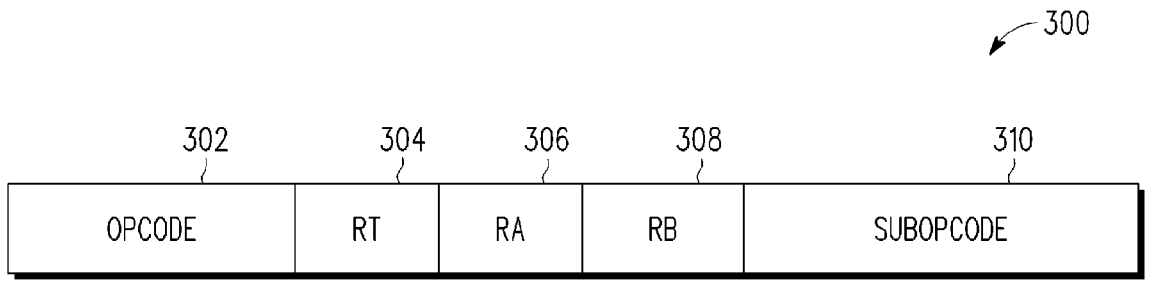
FIG. 4 illustrates, in diagrammatic form, a data processing instruction for implementing atomic operations remote from the processor in accordance with one form of the present invention.

In operation, an instruction is received by the processor 12 via the system bus 14 and bus interface unit 34. The instruction is fetched from the bus interface unit 34 by the instruction fetch unit 26 and coupled to the instruction pipeline 22. The instruction pipeline 22 decodes the instruction and controls the control circuitry 28 and the execution units 24 to execute the instruction. An example of the format of a load/store instruction is illustrated in FIG. 4 wherein an instruction 300 has various fields. A field 302 holds an instruction operation code (opcodes) which identifies what type of operation is associated with the instruction. Fields 304, 306 and 308 are register fields for respectively holding register designators RT, RA and RB which are registers within the general purpose registers 30. For a certain type of load/store instruction (a decorated load or a decorated store) register A (RA) holds a decoration value having a meaning and purpose that will be explained below. Register B (RB) contains a virtual address value. The virtual address is coupled by the load/store unit 32 to the translation look-aside buffer (TLB) 50 of the memory management unit 42 for translation to a physical address. Field 310 is a subopcode field which is used to further define the operation that is associated with the instruction. In one embodiment the subopcode field is used to distinguish decorated load and store instruction types from normal load and store instruction types. For a normal load or store instruction type, register RB may hold an index value to be added to the address value contained in register RA, or may not be used. For store-type instructions, register T (RT) holds data to be stored to a target device. For load-type instructions, register T (RT) indicates the destination register for holding the results of the load operation.

Figure 5:
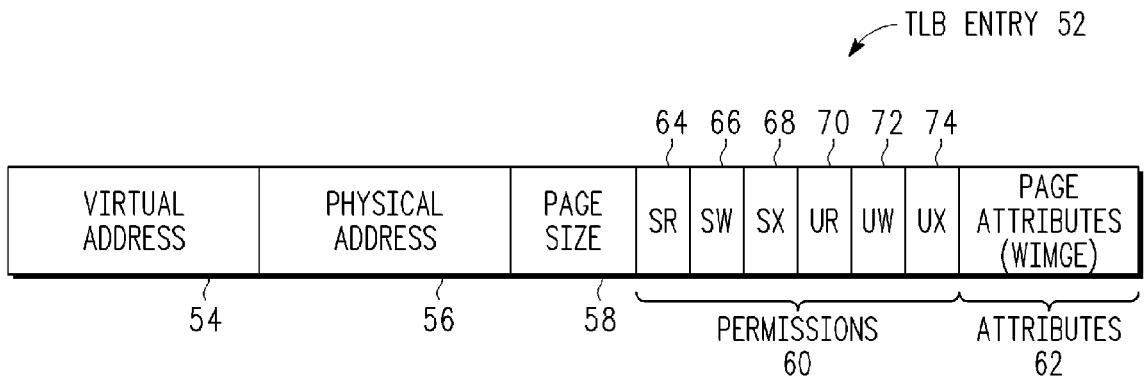
FIG. 5 illustrates, in diagrammatic form, a translation lookaside buffer (TLB) entry in accordance with one form of the present invention.

An example of one form of each TLB entry is provided in FIG. 5 wherein there is illustrated the details of the TLB entry 52. The TLB entry 52 has a stored virtual address 54. If the virtual address provided by the load/store unit 32 matches the virtual address 54, the TLB entry 52 is selected by the memory management unit 42. TLB entry 52 provides a virtual-to-physical address translation for the virtual address provided by the load/store unit 32 as well providing page attributes, and access permission values. The TLB entry 52 has an associated physical address 56 and a page size 58 which defines the memory size of the page in memory where the physical address 56 is located. A plurality of permissions 60 is included within the TLB entry 52. A supervisor read, SR, permission will permit a read of a target device when in supervisor mode if the SR permission bit is asserted. A supervisor write, SW, permission will permit a write of a target device when in supervisor mode if the SW permission bit is asserted. A supervisor execute, SX, permission will permit execution of an instruction at an address within a target device when in supervisor mode if the SX permission bit is asserted. A user read, UR, permission will permit a read of a target device when in user mode if the UR permission bit is asserted. A user write, UW, permission will permit a write of a target device when in user mode if the UW permission bit is asserted. A user execute, UX, permission will permit execution of an instruction at an address within a target device when in user mode if the UX permission bit is asserted. The TLB entry also contains a plurality of page attributes 62. Various attributes can be provided. As an example, the following attributes which form the acronym WIMGE are included:

W write-through cache operation
I caching inhibited operation
M memory coherency required
G guarded (where the access is to a volatile storage device)
E endianness (whether big endian or little endian ordering exists).

It should be understood that these common attributes are provided by way of example only, and other attributes may be included in addition or in lieu of the illustrated page attributes 62. For a normal load or store instruction, if the load/store unit 32 determines that the instruction operation type is not permitted in connection with the permissions obtained form the TLB entry 52 of TLB 50 then an exception is generated by the control circuitry 28 and exception processing is begun by processor 12. For example, if the processor 12 is operating in a user mode, as indicated by the S bit 29 of machine state register 31 having a value of "0", and the instruction is a load operation instruction, then permission bit UR (user mode read permission) from the TLB entry 52 must be set to allow for the read operation performed by the load instruction to occur. Likewise, if the instruction is a store instruction, then permission bit UW (user mode write permission) from the TLB entry 52 must be set to allow for the write operation performed by the store instruction to occur. Similar checks are performed when operating in supervisor mode (S bit 29 equals "1") using the SR and SW permission bits. In the case that the required permissions for a normal load or store instruction are not present, the load or store operation will be aborted by processor 12 and no transmission of the physical address and attributes to the target device specified by the instruction occurs. As can be seen for the case of a normal load or store instruction, all permissions evaluation for the type of access is performed within processor 12 prior to allowing initiation of an access to a target device via the system interconnect 14. In some embodiments however the normal permissions checking operation performed by load/store unit 32 are not performed for decorated load and decorated store instructions. In such embodiments, processor 12 is unaware of the actual operations which will be performed by a device receiving a decoration command via a decoration value, thus, processor 12 has no accurate mechanism to enforce access permissions using the permissions values provided by matching TLB entry 52 when the access address for the decorated load or decorated store instruction is translated. Instead, these access permissions provided by TLB entry 52 during the address translation process are provided to the target device for interpretation, and a subsequent access or operation within the target device is based on the actual permissions types required for the operation specified by the decoration value. In this case, load/store unit 32 of processor 12 does not enforce access permissions for the decorated load or decorated store instruction, but rather, provides the permissions information external to processor 12 for evaluation by the target device, as will be further illustrated in the discussion of FIG. 3. Note that an alternate embodiment may choose to enforce permissions both locally within processor 12, as well as at the target device, in the case that more extensive permissions are actually needed, but cannot be determined solely within the processor 12, since the actual operation to be performed is not completely known by the processor 12.

Figure 3:
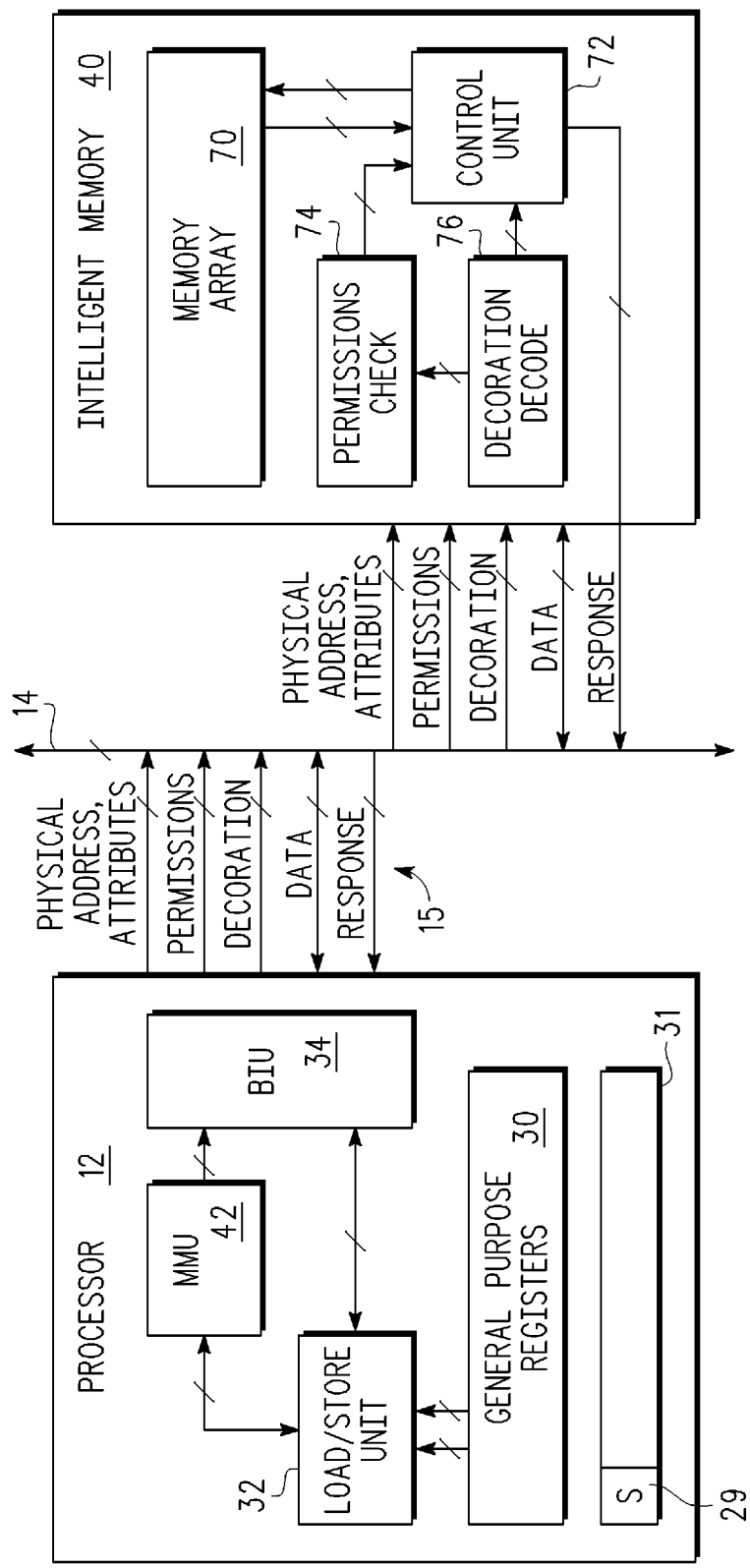
FIG. 3 illustrates in block diagram form, a portion of the data processing system of FIG. 1 illustrating the processor and an intelligent memory in accordance with one embodiment of the present invention.

Illustrated in FIG. 3 is further detail of one form of the direct connection of processor 12 and the intelligent memory 40 via the system bus 14, including details of the intelligent memory 40. The intelligent memory 40 has a memory array 70 coupled to a control unit 72 via separate single direction conductors. A decoration decode circuit 76 has a first output coupled to the control unit 72 and a second output coupled to an input of a permissions check circuit 74. The permissions check circuit 74 has an output coupled to an input of the control unit 72. An output of the control unit 72 provides a response back to the processor 12 via the system bus 14.

Figure 6:
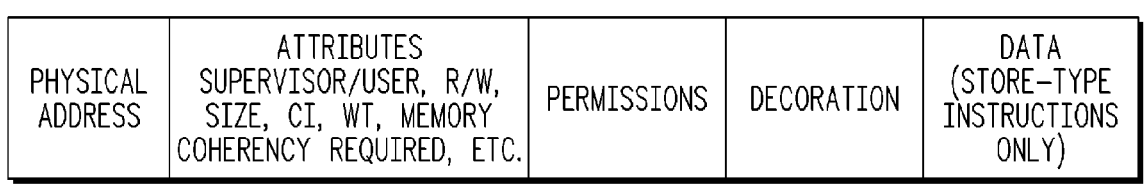
FIG. 6 illustrates, in diagrammatic form, a portion of the information transferred from the processor to the intelligent memory illustrated in FIG. 3.

In operation, the processor 12 provides to the intelligent memory 40 the information 601 of FIG. 6. A physical address corresponding to a location within memory array 70 is provided. Attributes associated with the physical address are provided. As illustrated in FIG. 6, these attributes include, for example, supervisor or user attribute, a read/write (R/W) attribute, a size attribute, a cache inhibited (CI) attribute, a write-through (WT) attribute, a memory coherency required attribute, and other possible attributes, if any. It should be understood that not all of the illustrated attributes are required to be provided. Permissions information, as will be described below, is also provided to the intelligent memory 40. For store-type instructions, store data is also provided. Additionally, decoration information is also provided to the intelligent memory 40. In the illustrated form the intelligent memory 40 includes control unit 72 which is capable of performing various processing functions on the information that is stored in memory array 70. Which specific predetermined processing function is dependent on the result of the decoration decode circuit 76 which decodes a provided decoration value, and in some embodiments may also be dependent on the particular physical address value and attributes provided to intelligent memory 40. In one embodiment, a decoration attribute provided to the intelligent memory 40 is used to indicate that the memory access request is a decorated load or store operation, rather than a normal load or store operation. In an alternate embodiment, a particular predetermined decoration value may be interpreted to indicate a normal load or store operation is being requested, in which case no special operation is to be performed.

Illustrated in FIG. 7 is an operation table of exemplary decoration values associated with a decorated load operation and a decorated store operation when the target device is intelligent memory 40. The operation table also correlates the permissions that are required for operation that are associated with the instruction operation. For example for a decorated load instruction, when the decoration value is 000, the decoration operation is a clear location operation which requires a Write (W) permission. The addressed location associated with the decorated load operation is to be cleared when the decoration value is 000. When the decoration value is 001 for a decorated load instruction, the decoration operation is to increment the location specified by the address associated with the decorated load operation and to provide the last value that was in the specified location. In order to perform this operation, the required permissions are both a Read (R) permission and a Write (W) permission. When the decoration value is 010 for a decorated load instruction, the decoration operation is to read the location specified by the address associated with the load operation. In order to perform this operation, the required permission is a Read (R) permission. When the decoration value is 111 for a decorated load instruction, the decoration operation is null and no operation is performed to the location specified by the address associated with the decorated load operation. In order to perform this operation, there is no specified required permission. Similarly, for a decorated store instruction, when the decoration value is 000, the decoration operation is to add a predetermined data value to the location specified by the instruction address. In order to perform this operation, the required permissions are both a Read (R) permission and a Write (W) permission. The predetermined data value may be supplied as a data value by processor 12 as is normally provided for store-type instructions, or may be determined in an alternate manner by decoration decode circuit 76 or control unit 72 of intelligent memory 40. When the decoration value is 001, the decoration operation is to add the value from a source location in memory array 70 to the value in the location indicated by the physical address of the decorated store. The source location within memory array 40 may be indicated by the data value provided by processor 12 for the decorated store instruction. When the decoration value for a decorated store instruction is 111, the decoration operation is to multiply a predetermined value with the data in the location specified by the instruction address. In order to perform this operation, the required permission is a Write (W) permission. For a normal load or normal store instruction operation, the decoration value is ignored, and no permissions checking is required by the table entry of FIG. 7. For these operations, it is assumed that the required permissions have already been checked by processor 12 prior to initiation of the access to the target device. It should be understood that the encodings provided in the operation table of FIG. 7 are provided by way of example only. Any number of bit sizes may be implemented as the decoration value and other types of instruction operation and decoration operations may be readily used. Decoration decode circuit 76 and permissions check circuit 74 of intelligent memory 40 serve to perform remote permissions checking of the received decorated load or decorated store operation. For each decoration value, the required permissions for operation are determined by decoration decode circuit 76 and are provided to permissions check circuit 74. Permissions check circuit 74 compares the permissions values from system interconnect 14 received with the access request with the required permissions for the decoration operation as determined by decoration decode circuit 76 and determines whether sufficient permissions are present to allow the decorated load or store operation to occur. If sufficient permissions are not present, permissions check circuit 74 informs control unit 72 of intelligent memory 40 that the operation should not occur. In response, control unit 72 provides a response back to processor 12 via response signals transmitted on system interconnect 14 indicating an exception condition has occurred, and no operation is performed to memory array 70. If the results of the checking performed by permissions check circuit 74 indicate that the required permissions for the operation performed by the received instruction operation and decoration value are satisfactory, it indicates such to control unit 72, which may then proceed with the indicated operation(s) and provide a normal response back to processor 12 upon successful completion of the required operation.

Figure 8:
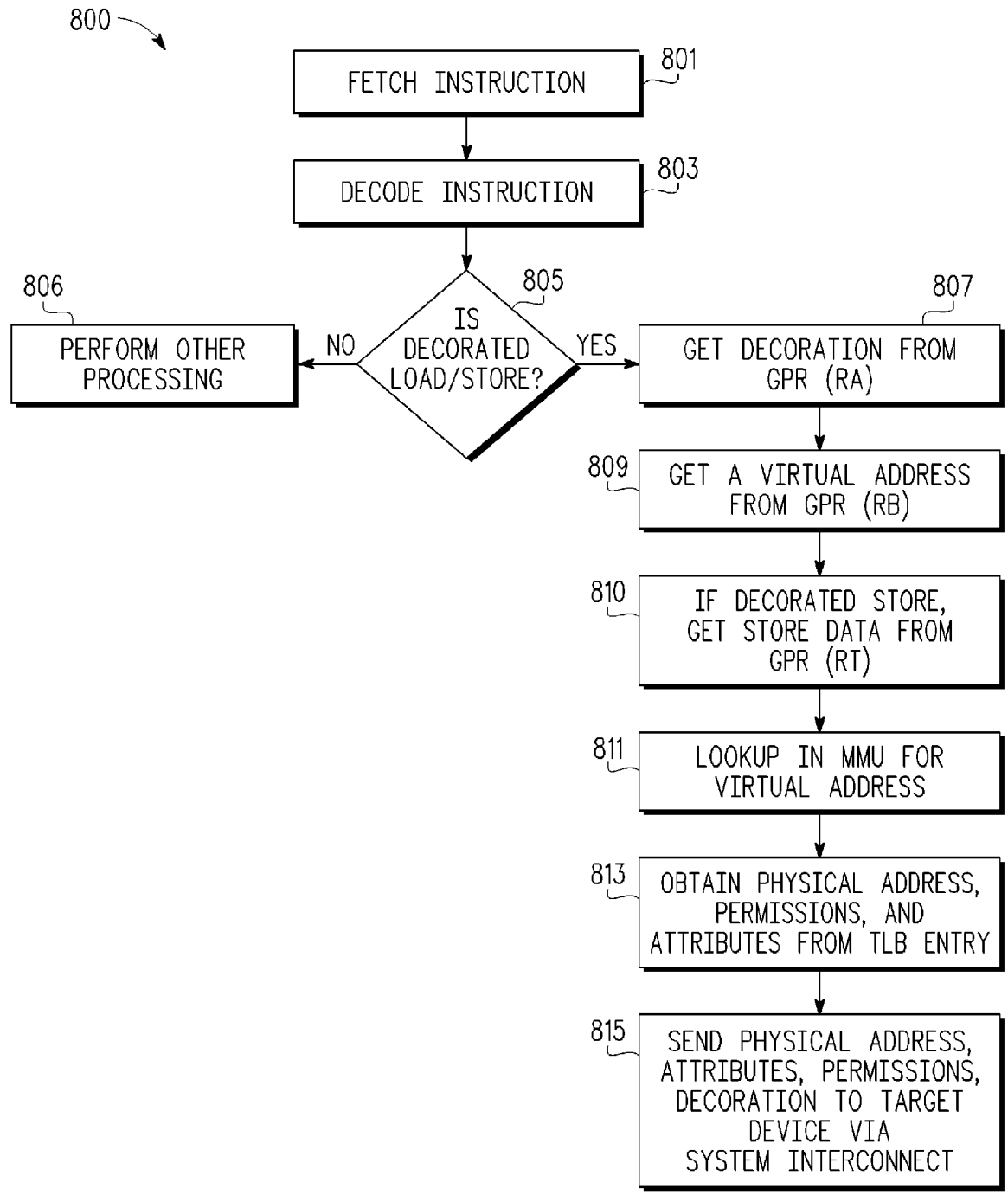
FIG. 8 illustrates, in flow chart form, an exemplary method of processing an instruction having permissions information in accordance with the present invention.

Illustrated in FIG. 8 is a method 800 illustrating one form of how an instruction having permissions information to be transferred to a target device is executed. In a step 801 the instruction is fetched such as by the instruction fetch unit 26 via the bus interface unit 34 of FIG. 2. In a step 803 the instruction is decoded. In one form the decoding occurs in the instruction pipeline 22 of FIG. 2. In a step 805 a determination is made whether the fetched and decoded instruction is a decorated load/store instruction. If the decoded instruction is not a decorated load/store instruction then other processing of the instruction than described herein is performed in a step 806. If the decoded instruction is a decorated load/store instruction, in a step 807 the load/store unit 32 gets a decoration (i.e. a decoration command) from one (register A, RA) of the general purpose registers (GPR) 30. In a step 809 the load/store unit 32 obtains a virtual address defined by the instruction from one (register B, RB) of the general purpose registers (GPR) 30. If the operation is a decorated store, the load/store unit 32 in a step 810 gets a store data value from one (e.g. register T, RT) of the general purpose registers (GPR) 30 of FIG. 3. The load/store unit 32 under control of the control circuitry 28 functions to find or lookup in the translation lookaside buffer (TLB) 50 of memory management unit (MMU) 42 the virtual address which was designated by register B in a step 811. A match of stored virtual addresses in the MMU 42 with the virtual address from register B is identified. The matching virtual address is stored in a predetermined TLB entry of the TLB 50 such as TLB entry 52 of FIG. 2. In a step 813 a correlated physical address, permissions and page attributes are obtained from the TLB entry 52 and sent to the load/store unit 32. In a step 815 the physical address, attributes, permissions and decoration are sent to a designated target device via the bus interface unit 34 and the system interconnect or system bus 14. If the operation is a decorated store, store data is also sent to the system interconnect 14. From the perspective of the hardware of processor 12, this operation appears to be a conventional load or store operation and the processor 12 is not aware of the function of the decoration or its consequences.

Figure 9:
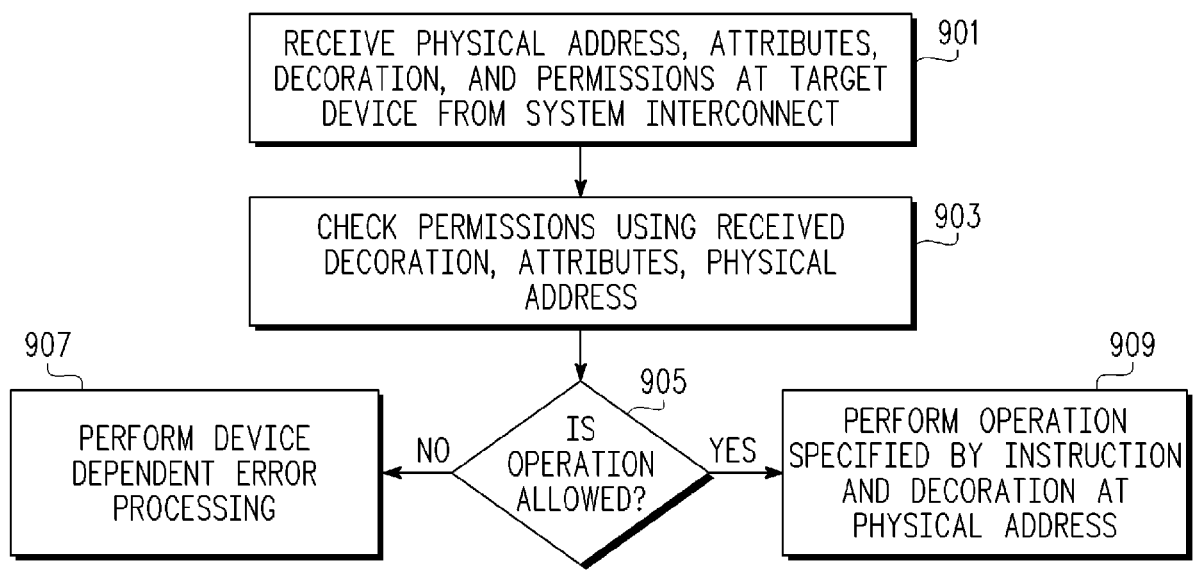
FIG. 9 illustrates, in flow chart form, an exemplary method of using information from a processor to perform permissions checking in accordance with the present invention.

Illustrated in FIG. 9 is a method illustrating one form of the processing of the sent information by the target device to perform permissions checking. In a step 901 the target device receives the physical address, attributes, the decoration and permissions from the system interconnect or system bus 14. In a step 903 the target device checks permissions using the received decoration, attributes and physical address. In a step 905 the target device 905 determines whether the specified operation from the decoration is allowed. If the operation is not allowed, a step 907 is implemented wherein an exception is taken and device-dependent error processing is performed. If the operation is allowed, a step 909 is implemented wherein the operation that is specified by the instruction and the decoration is performed at the physical address. As part of step 907, in one embodiment, an exception may be indicated or signaled back to the system interconnect to be provided to the initiator of the access. In an alternate embodiment, a null response or a predetermined data value, such as all zeroes may be delivered by the target device in lieu or an exception response. In one embodiment, if partial permissions are present, then a portion of the operation may be performed and other portions not performed.

By now it should be appreciated that there has been provided a data processing system that enforces access permissions at an intelligent target device for a particular class of memory access instructions. In one form the target device is a memory with additional circuitry for performing functions additional to data storage. The target device receives a command in the form of a decoration value along with an address and permissions. The target device enforces the permissions required for the particular command (decoration value) that is to be acted upon. A normal or conventional system interconnect protocol is used and thus specialized protocol extensions are avoided. In one form the permissions are not enforced local to the processor but are instead enforced at the target device after decoding the decoration value. If the permissions check partially succeeds, the memory may proceed with the operation and return load data if the decoded instruction was a load instruction. If the permissions check fails, then the operation is aborted. In the case of the permissions check by the target device failing, a transfer error may be generated by the target device and sent back to the processor in one form and the requested operation terminated by the target device. In another form the target device may generate a default value, such as a null value of all zeros, for loading into the identified address of the target device, or for provision back to the initiator. Thus there is herein provided a permissions checking operation for a target device for a subset of data processing transactions including decorated load and decorated store transactions. Other types of decorated transactions can be implemented. In another form the processor 12 can optionally perform a first level permissions check to determine if high level permissions, such as read permissions or write permissions, exist. However, the target device performs a final confirmation of permissions, based upon the operation that is indicated by the decoration value which is not interpreted or decoded by the processor 12. In this optional embodiment the first level permissions check will cause the processor 12 to begin exception processing and prevent the transmission of the information 601 of FIG. 6.

Because the apparatus implementing the present invention is, for the most part, composed of electronic components and circuits known to those skilled in the art, circuit details has not been explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary data processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. It should be understood that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. Any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of data processing system 10 are circuitry located on a single integrated circuit or within a same device. Alternatively, data processing system 10 may include any number of separate integrated circuits or separate devices interconnected with each other. For example, intelligent memory 40 may be located on a same integrated circuit as processor 12 or on a separate integrated circuit or located within another peripheral or slave discretely separate from other elements of data processing system 10. Peripherals 18 and 20 may also be located on separate integrated circuits or devices. Also for example, data processing system 10 or portions thereof may be readily transformed into software as a representation of physical circuitry or of logical representations convertible into physical circuitry. As such, data processing system 10 may be embodied in a hardware description language of any appropriate type.

In one form there is herein provided a method for operating a data processing system, the data processing system including a processor and a target device coupled via a system interconnect. An instruction is processed by the processor, the processing including determining an instruction operation and an address. A decoration value is determined by the processor based on the instruction. Access permissions associated with the address are provided. An indication of the instruction operation, the address, the decoration value, and the access permissions associated with the address are sent in a transaction to a target device via the system interconnect. In another form determining the access permissions includes obtaining the access permissions associated with the address from a translation lookaside buffer of the processor. In yet another form a permissions check of the instruction operation based upon the access permissions is performed by the target device. The instruction operation is not performed based upon a failure of the permissions check. In another form the performing by the target device of the instruction operation is based upon the access permissions and the decoration value wherein the decoration value provides a function to be performed by the target device as part of performing the instruction operation. In another form the decoration value is determined by obtaining the decoration value from a field of the instruction. In another form the decoration value is determined by obtaining the decoration value from a register of the processor. In another form the access permissions are determined by the processor by determining a write access permission. In another form the processing further includes determining attributes of the instruction. The sending in a transaction further includes sending the attributes in the transaction. In another form the instruction operation includes one of the group consisting of a load operation and a store operation. The instruction operation is performed by the target device. In another form the target device is implemented as a memory.

In another form there is provided a method of operating a data processing system. A target device receives a transaction via a system interconnect of the data processing system, the transaction generated by a processor of the data processing system, the transaction including an indication of an instruction operation to be performed by the target device, an address, a decoration value, and access permissions associated with the address. The target device determines whether a decoration operation specified by the decoration value is permissible based on the received access permissions. In another form the decoration operation is performed by the target device based on the decoration operation being permissible based on the determining. In another form the determining by the target device whether a decoration operation specified by the decoration value is permissible is implemented by the target device determining access permission types to be checked based on the decoration operation. The received access permissions are checked for the access permission types. A determination is made whether the decoration operation is permissible based on whether the access permission types of the received access permissions indicate that the decoration operation is permissible. In another form the target device performs the instruction operation corresponding to the address. In another form the target device is implemented as a memory wherein the instruction operation is one of the group consisting of a load operation from the memory or a store operation to the memory. In another form the decoration operation is implemented to include one of the group consisting of an add operation to a value stored at a location designated by the address, wherein the instruction operation is a store operation of a second value to the location, wherein performing the store operation and the decoration operation add the second value to the value to generate a resultant value, wherein the resultant value is stored at the location; and a clear operation of a location designated by the address, wherein the instruction operation is a load operation from the location, wherein the instruction operation is performed before the clear operation. In another form the instruction operation is not performed if the decoration operation is determined not to be permissible based on the determining. In another form the target device responds to the processor with a response, wherein the response is based on results of the determining.

In another form there is provided a method for operating a data processing system. A first device of the data processing system generates an indication of an instruction operation, an address associated with the instruction operation, a decoration value, and access permissions associated with the address. An indication of the instruction operation, the address, the decoration value, and the access permissions associated with the address are sent in a transaction to a target device via the system interconnect. The transaction is received by the target device. The target device determines whether a decoration operation specified by the decoration value is permissible based on the received access permissions. In another form the first device is implemented as a processor and the target device is implemented as a memory, wherein the instruction operation is one of the group consisting of a load operation from the memory or a store operation to the memory. In another form the decoration operation is performed by the target device based on the decoration operation being permissible.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, data processing system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Although the invention is described herein with reference to specific embodiments, various modifications and changes can be made without departing from the scope of the present invention as set forth in the claims below. For example, the number of bits used in the address, attributes, permissions and decorations fields may be modified based upon system requirements. The permissions that are associated with a particular operation may vary or be modified. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

What is claimed is:

1. A method for operating a data processing system, the data processing system including a processor and a target device coupled via a system interconnect, the method comprising:
   processing an instruction by the processor, the processing including determining an instruction operation and an address;
   determining by the processor, a decoration value based on the instruction;
   providing by the processor, access permissions associated with the address; and
   sending in a transaction
      an indication of the instruction operation,
      the address,
      the decoration value, and
      the access permissions associated with the address to a target device via the system interconnect, wherein the instruction performs a first function at the address, and the decoration value performs a second function at the address.

2. The method of claim 1 wherein the determining access permissions includes obtaining the access permissions associated with the address from a translation lookaside buffer of the processor.

3. The method of claim 1 further comprising:
   performing by the target device, a permissions check of the instruction operation based upon the access permissions; and
   not performing the instruction operation based upon a failure of the permissions check.

4. The method of claim 3 further wherein the performing by the target device of the instruction operation is based upon the access permissions and the decoration value wherein the decoration value provides a function to be performed by the target device as part of performing the instruction operation.

5. The method of claim 1 further comprising determining the decoration value by obtaining the decoration value from a field of the instruction.

6. The method of claim 1 further comprising determining the decoration value by obtaining the decoration value from a register of the processor.

7. The method of claim 1 wherein the access permissions determined by the processor further comprise determining a write access permission.

8. The method of claim 1 wherein:
the processing further comprising determining attributes of the instruction; and
the sending in a transaction further comprises sending the attributes in the transaction.

9. The method of claim 1 wherein the instruction operation includes one of the group consisting of a load operation and a store operation, and further comprising:
performing the instruction operation by the target device.

10. The method of claim 1 further comprising implementing the target device as a memory.

11. A method of operating a data processing system, the method comprising:
receiving by a target device, a transaction via a system interconnect of the data processing system, the transaction generated by a processor of the data processing system, the transaction including an indication of an instruction operation to be performed by the target device, an address, a decoration value, and access permissions associated with the address; and
determining by the target device whether a decoration operation specified by the decoration value is permissible based on the access permissions which are received, wherein the instruction performs a first function at the address, and the decoration value performs a second function at the address.

12. The method of claim 11 further comprising:
performing the decoration operation by the target device based on the decoration operation being permissible based on the determining.

13. The method of claim 11 wherein the determining by the target device whether a decoration operation specified by the decoration value is permissible comprises:
the target device determining access permission types to be checked based on the decoration operation;
checking the access permissions which are received for the access permission types; and
determining whether the decoration operation is permissible based on whether the access permission types of the access permissions which are received indicate that the decoration operation is permissible.

14. The method of claim 13 further comprising:
performing by the target device the instruction operation corresponding to the address.

15. The method of claim 11 further comprising implementing the target device as a memory wherein the instruction operation is one of the group consisting of a load operation from the memory or a store operation to the memory.

16. The method of claim 11 further comprising:
implementing the decoration operation to include one of the group consisting of:
an add operation to a value stored at a location designated by the address, wherein the instruction operation is a store operation of a second value to the location, wherein performing the store operation and the decoration operation add the second value to the value to generate a resultant value, wherein the resultant value is stored at the location; and
a clear operation of a location designated by the address, wherein the instruction operation is a load operation from the location, wherein the instruction operation is performed before the clear operation.

17. The method of claim 11 further comprising:
not performing the instruction operation if the decoration operation is determined not to be permissible based on the determining.

18. The method of claim 11 further comprising:
responding by the target device to the processor with a response, wherein the response is based on results of the determining.

19. A method for operating a data processing system, the method comprising:
generating by a first device of the data processing system, an indication of an instruction operation, an address associated with the instruction operation, a decoration value, and access permissions associated with the address;
sending in a transaction an indication of the instruction operation, the address, the decoration value, and the access permissions associated with the address to a target device via a system interconnect;
receiving by a target device the transaction; and
determining by the target device, whether a decoration operation specified by the decoration value is permissible based on the access permissions associated with the address, wherein the instruction operation performs a first function at the address, and the decoration operation performs a second function at the address.

20. The method of claim 19 further comprising:
implementing the first device as a processor and the target device as a memory, wherein the instruction operation is one of the group consisting of a load operation from the memory or a store operation to the memory.

21. The method of claim 20 further comprising:
performing the decoration operation by the target device based on the decoration operation being permissible.

* * * * *